(12) United States Patent
Kim et al.

(10) Patent No.: US 8,483,316 B2
(45) Date of Patent: Jul. 9, 2013

(54) MODULATION APPARATUS, MODULATION METHOD, DEMODULATION APPARATUS, AND DEMODULATION METHOD

(75) Inventors: Jaehwan Kim, Daejeon (KR); Jung-yeol Oh, Daejeon (KR); Hyung Soo Lee, Daejeon (KR); Jae Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 398 days.

(21) Appl. No.: 12/963,994

(22) Filed: Dec. 9, 2010

(65) Prior Publication Data

US 2011/0150124 A1  Jun. 23, 2011

(30) Foreign Application Priority Data

Dec. 17, 2009 (KR) .......................... 10-2009-0126259

(51) Int. Cl.
*H03C 3/00* (2006.01)
*H03K 7/06* (2006.01)
*H04L 27/12* (2006.01)

(52) U.S. Cl.
USPC ........... 375/302; 375/295; 375/308; 375/316; 375/322; 375/329; 375/340; 329/304

(58) Field of Classification Search
USPC ................. 375/295, 302, 308, 316, 322, 329, 375/340; 329/304
See application file for complete search history.

(56) References Cited

U.S. PATENT DOCUMENTS

| | | | |
|---|---|---|---|
| 6,046,630 A * | 4/2000 | Kim ............................. | 329/304 |
| 6,195,534 B1 * | 2/2001 | Sakoda et al. .................. | 455/45 |
| 2007/0071136 A1 * | 3/2007 | Lai et al. ....................... | 375/329 |
| 2007/0165591 A1 * | 7/2007 | Higure et al. ................. | 370/346 |
| 2010/0135431 A1 | 6/2010 | Kim et al. | |
| 2011/0122969 A1 * | 5/2011 | Oh et al. ....................... | 375/302 |
| 2012/0112885 A1 * | 5/2012 | Drucker ....................... | 340/10.1 |

FOREIGN PATENT DOCUMENTS

KR  2001-0111668  12/2001
KR  10-2010-0062688  6/2010

OTHER PUBLICATIONS

Kim, D., "Phase-Silence-Shift Keying for Power-Efficient Modulator," Jun. 2009, IEICE Trans. Commun., vol. E92-B, p. 2324-2326.*
Oh, J., "A pi/4-shifted Differential 8PSSK Modulation for High Data Rate WBAN System", Nov. 2009, 2009 International Conference on Interaction Science, vol. 403, p. 1437-1440.*
Kim, J., "Project: IEEE P802.15 Working Group for Wireless Personal Area Network (WPANs)", Jul. 2009, IEEE 15-09-0179-04-0006.*

* cited by examiner

*Primary Examiner* — Shuwang Liu
*Assistant Examiner* — Sung Ahn
(74) *Attorney, Agent, or Firm* — Staas & Halsey LLP

(57) ABSTRACT

A modulation apparatus performs modulation in which a signal wave form is positioned at the front part of an entire symbol duration or the latter part of the entire symbol duration based on a first bit of the bit information to generate a modulation symbol including a silent signal duration in which there is no signal waveform. Particularly, the method delays a signal corresponding to a quadrature-phase signal axis by a predetermined time, thereby cancelling a phase difference between symbols.

7 Claims, 9 Drawing Sheets ized to be a single part of the entire symbol duration based on a first bit of the bit information to generate a modulation symbol including a silent signal duration in which there is no signal waveform; and a transmitter for transmitting the generated modulation symbol.

MODULATION APPARATUS, MODULATION METHOD, DEMODULATION APPARATUS, AND DEMODULATION METHOD

CROSS-REFERENCE TO RELATED APPLICATION

This application claims priority to and the benefit of Korean Patent Application No. 10-2009-0126259 filed in the Korean Intellectual Property Office on Dec. 17, 2009, the entire contents of which are incorporated herein by reference.

BACKGROUND OF THE INVENTION (a) Field of the Invention

The present invention relates a modulation apparatus, a modulation method, a demodulation apparatus, and a demodulation method.

(b) Description of the Related Art

Generally, in a wireless communication system, power consumption has a huge effect on characteristics of a power amplifier, which necessitates a power amplifier that has high power efficiency while improving frequency efficiency and efficient modulation and demodulation methods for the power amplifier.

A non-linear modulation method such as on-off keying (OOK) may use a non-linear power amplifier having high power efficiency.

Meanwhile, when a linear modulation method such as phase shift keying or quadrature amplitude modulation (QAM) that has high frequency efficiency uses a non-linear power amplifier having high power efficiency, the performance of the linear modulation method is degraded.

Therefore, the PSK or QAM method with high frequency efficiency should use a linear power amplifier, thereby increasing power consumption of a transmitting apparatus.

Research on using a non-linear power amplifier with high power efficiency in the linear and non-linear modulation methods has been undertaken to reduce the power consumption of the transmitting apparatus, and the research may be classified into two approaches.

The first approach is to compensate distortion of a signal caused by non-linear characteristics by processing an input signal or output signal of a non-linear power amplifier. The first approach should constitute complex compensation circuits in the front or rear of the non-linear amplifier, thereby increasing complexity of a wireless communication system and the cost for embodying the first approach.

The second approach uses a linear power amplifier and controls bias voltage thereof in order to reduce power consumption. The second approach can reduce the cost for embodying the second approach, and thus research for controlling the bias voltage of the linear power amplifier is now in progress.

According to the progress in controlling the bias voltage of the linear power amplifier, the relation between an instant envelope curve of the signal input to the linear power amplifier and the power consumption is considered important.

From this point of view, a modulation method including a silence signal such as a pulse position modulation (PPM) or bi-orthogonal PPM (BPPM) is considered to have an advantage in reducing the power consumption of the linear power amplifier. The PPM or BPPM method, however, has a silence signal duration, thereby making the frequency efficiency low.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a modulation apparatus, a modulation method, a demodulation apparatus, and a demodulation method that have advantages of improving frequency efficiency characteristics with a high power efficiency characteristic.

An exemplary embodiment of the present invention provides an apparatus for modulating bit information, the apparatus including: a symbol generator for performing modulation in which a signal wave form is positioned at a front part of an entire symbol duration or a latter part of the entire symbol duration based on a first bit of the bit information to generate a modulation symbol including a silent signal duration in which there is no signal waveform; and a transmitter for transmitting the generated modulation symbol.

Another embodiment of the present invention provides an apparatus for demodulating a received signal that includes bit information of a transmitting apparatus, the apparatus including: a signal separator for separating the received signal into an in-phase signal corresponding to a plurality of first baseband axes that include a cosine function and a quadrature-phase signal corresponding to a plurality of second baseband axes that include a sine function; a delaying unit for delaying the in-phase signal by a predetermined time; and a signal determining unit for comparing the delayed in-phase signal with the quadrature-phase signal from the signal separator and determining bit information transmitted from the transmitting apparatus based on the result of comparison.

Yet another embodiment of the present invention provides a method for modulating bit information, the method including: mapping the bit information to symbols to generate a plurality of baseband symbols; multiplying a first baseband symbol among the plurality of baseband symbols by a cosine function to output an in-phase signal; multiplying a second baseband symbol among the plurality of baseband symbols by a sine function to output a quadrature-phase signal; applying a third baseband symbol among the plurality of baseband symbols to each of the in-phase signal and the quadrature-phase signal and outputting the in-phase signal and the quadrature-phase signal that include a silent signal duration, respectively; delaying one of the in-phase signal and the quadrature-phase signal that include the silent signal duration; and adding the delayed one and the other that is not delayed to generate a modulation symbol.

Yet another embodiment of the present invention provides a method for demodulating a received signal that includes bit information of a transmitting apparatus, the method including: separating the received signal into an in-phase signal corresponding to a plurality of first baseband axes that include a cosine function and a quadrature-phase signal corresponding to a plurality of second baseband axes that include a sine function; delaying one of the in-phase signal and the quadrature-phase signal by a predetermined time; dividing the delayed one and the other among the quadrature-phase signal and the in-phase signal into a first duration that corresponds to a front part of an entire symbol duration and a second duration that corresponds to a latter part of the entire symbol duration and integrating each of them by the first and second durations; and comparing a value obtained from the integration for the first duration with a value obtained from the integration for the second duration and determining the bit information transmitted from the transmitting apparatus based on the result of comparison.

DETAILED DESCRIPTION OF THE EMBODIMENTS

Figure 1:
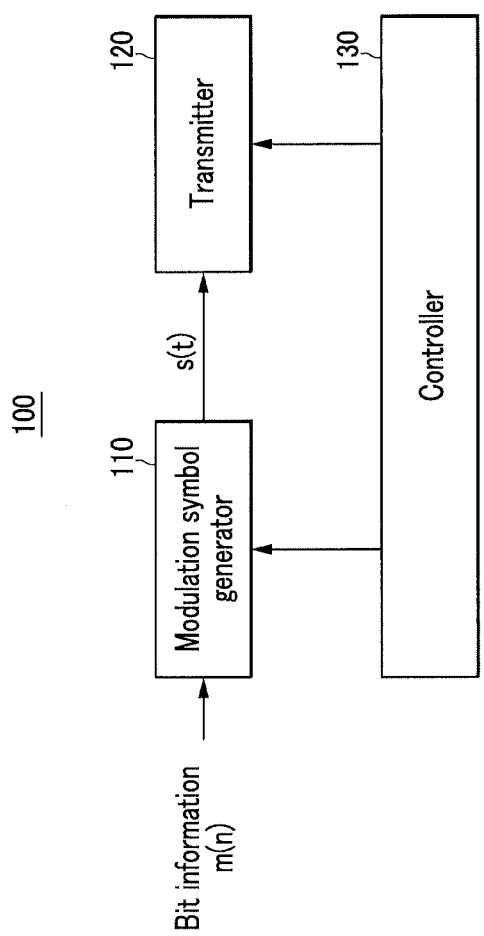
FIG. 1 shows a block diagram of a modulation apparatus according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

A modulation apparatus, a modulation method, a demodulation apparatus, and a demodulation method will now be described.

FIG. 1 shows a block diagram of a modulation apparatus according to an exemplary embodiment of the present invention.

Referring to FIG. 1, a modulation apparatus 100 according to an exemplary embodiment of the present invention includes a modulation symbol generator 110, a transmitter 120, and a controller 130.

The modulation symbol generator 110 generates a modulation symbol [s(t)] by modulating bit information [m(n)] to be transmitted based on offset phase silence shift keying (hereinafter referred to as "OPSSK") modulation.

The transmitter 120 transmits the modulation symbol [s(t)].

The controller 130 controls the modulation symbol generator 110 to perform the OPSSK modulation on the bit information [m(n)] and controls the transmitter 120 for the transmission of the modulation symbol [s(t)].

Figure 2:
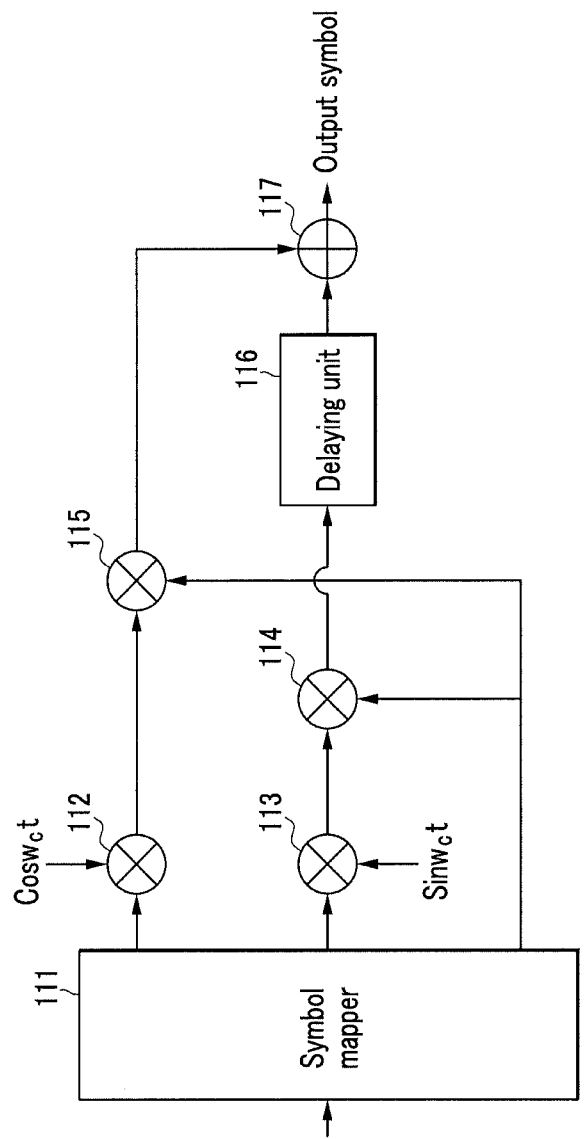
FIG. 2 shows a configuration of a modulation symbol generator in FIG. 1.

FIG. 2 shows a configuration of the modulation symbol generator in FIG. 1.

Referring to FIG. 2, the modulation symbol generator 110 includes a symbol mapper 111, multipliers 112-115, a delaying unit 116, and an adder 115.

The symbol mapper 111 generates baseband symbols $b_1$, $b_2$, and $b_3$ by mapping bit information [m(n)] to be transmitted to symbols. At this time, the symbol mapper 111 performs phase silence shift keying (hereinafter referred to as "PSSK") modulation as Equation 1.

$$s(t) = \sum_{n=0}^{\infty} \text{Re}\{g_{m(n)}(t-nT)e^{j2\pi \text{mod}(m(n),0.5M)/0.5M} e^{j\pi f_c(t-nT)}\}, \quad \text{(Equation 1)}$$

$$0 \leq t \leq T$$

$g_{m(n)}(t)$ may be shown according to a value of a first bit $p^0_{(t)}$ or $p^1_{(t)}$ as Equation 2.

$$p^0(t)=u(t)-u(t-0.5T),$$

$$p^1(t)=u(t)-u(t+0.5T), \text{ where } 0 \leq t \leq T \quad \text{(Equation 2)}$$

Here, M represents the number of symbols. For example, when M is 4, it means that there are four symbols of 2-bit information, and when M is 8, it means that there are eight symbols of 3-bit information. That is, M represents the number of symbols having $\log_2(M)$-bit information.

Here, the modulation apparatus according to an exemplary embodiment of the present invention generates symbols of 3-bit information, but is not restricted thereto.

T represents a duration for a symbol, t represents time, and $f_c$ represents a carrier frequency. u(t) represents a unit step function, and may be shown as Equation 3.

$$u(t)=1, \text{ if } t \geq 0$$

$$u(t)=0, \text{ if } t<0 \quad \text{(Equation 3)}$$

If u(t) is applied to Equation 2, $g_{m(n)}(t)$ becomes a pulse waveform. Here, when the first bit of a symbol is "0" ($p^0_{(t)}$), the front half T/2 of a T symbol duration (may be referred to as "front part") becomes a silence signal duration where there is no signal. Meanwhile, when the first bit of a symbol is "1" ($p^1_{(t)}$), the latter half T/2 of the T symbol duration (may be referred as "latter part") becomes a silence signal duration where there is no signal. $g_{m(n)}(t)$ has a sound signal duration and a silence signal duration.

Also, the opposite cases can occur. That is, when the first bit of a symbol is "0", the latter half of the symbol duration T/2 becomes a silence signal duration, and when the first bit of a symbol is "1", the front half of the symbol duration T/2 becomes a silence signal duration.

The symbol mapper 111 generates baseband symbols $b_1$, $b_2$, and $b_3$ based on $e^{j2\pi \text{mod}(m(n),0.5M)/0.5M}$ and $g_{m(n)}(t)$ of Equation 1. The generated baseband symbols $b_1$ and $b_2$ correspond with $e^{j2\pi \text{mod}(m(n),0.5M)/0.5M}$ of Equation 1, and the generated symbol $b_3$ is shown as Equation 2. That is, the silence signal duration in PSSK is determined on the basis of the first bit of a 3-bit symbol.

The multiplier 112 multiplies the baseband symbol $b_1$ and a cosine function ($\cos w_c t$) and outputs the same to the adder 115. The multiplier 113 multiplies the baseband symbol $b_2$ and a sine function (sinw$_c$t) and outputs the same to the adder 115. At this time, the w$_c$ represents 2πf$_c$.

A wave form of a sound signal duration where there is a signal is determined by respectively multiplying baseband symbols b$_1$ and b$_2$ with a cosine function and a sine function.

Meanwhile, the baseband symbol b$_3$ in which a silent signal duration has been determined through the symbol mapper 111 is multiplied by the baseband symbols b$_1$ and b$_2$ of a sound signal duration output from the multipliers 112 and 113, respectively. That is, the multiplier 114 multiplies the output of the multiplier 113 and the baseband symbol b$_3$ to output an in-phase signal corresponding to the first baseband signal axis.

The multiplier 115 multiplies the output of the multiplier 112 and the baseband symbol b$_3$ to output a quadrature-phase signal corresponding to the second baseband signal axis.

Here, the first baseband signal axis represents a plurality of signals that are configured by a multiplication of a cosine function and a first pulse waveform, and the second baseband signal axis represents a plurality of signals that are configured by a multiplication of a sine function and a second pulse waveform. The first pulse waveform and the second pulse waveform are opposite each other.

The in-phase signal and the quadrature-phase signal respectively output from the multipliers 114 and 115 include a sound signal duration and a silent signal duration.

Among the signals generated from the above processes, a signal of the second baseband signal axis, i.e., the quadrature-phase signal, is delayed by the delaying unit 116. In detail, the quadrature-phase signal is delayed by the half (T/2) of the entire symbol duration T.

Next, the in-phase signal of the first baseband signal axis that is not delayed and the quadrature-phase signal are added and output as a modulation symbol (s(t)) of a final output. That is, the adder 117 adds the output of the multiplier 115 and the output of the delaying unit 116 and outputs the same.

Figure 3:
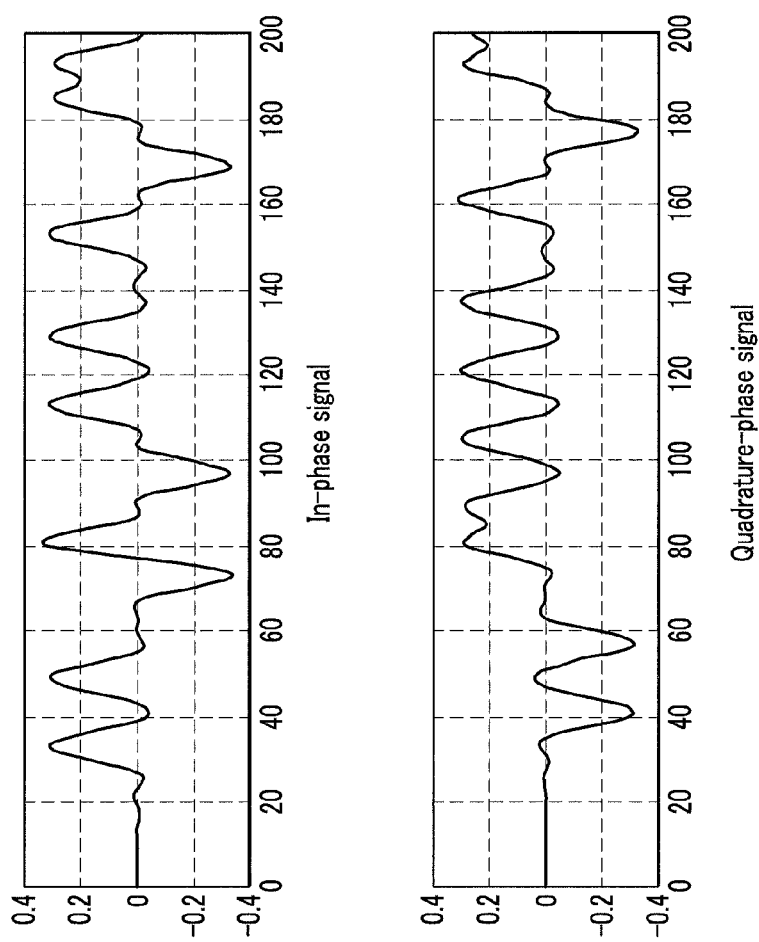
FIG. 3 shows a waveform diagram of a signal output from a modulation apparatus according to an exemplary embodiment of the present invention.
Figure 4:
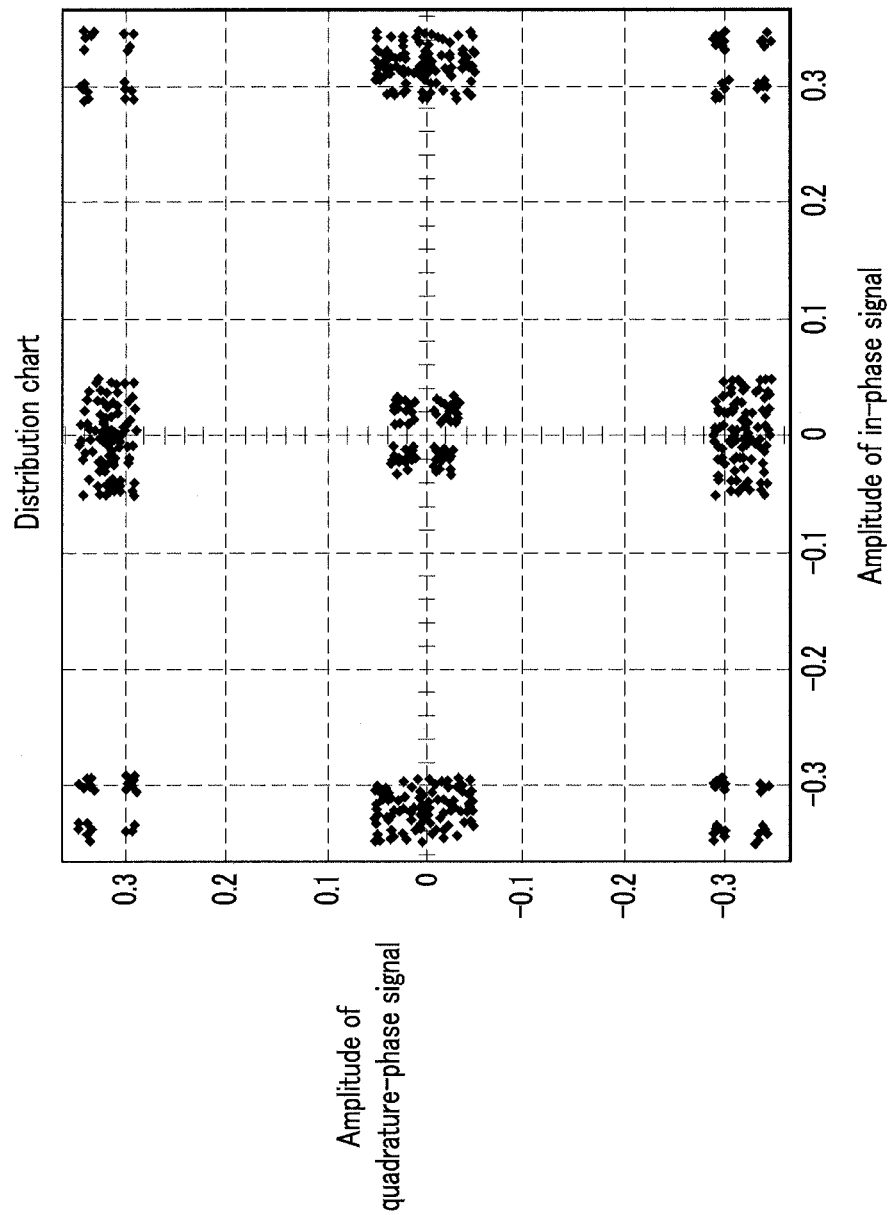
FIG. 4 shows a constellation of a signal output from a modulation apparatus according to an exemplary embodiment of the present invention.
Figure 5:
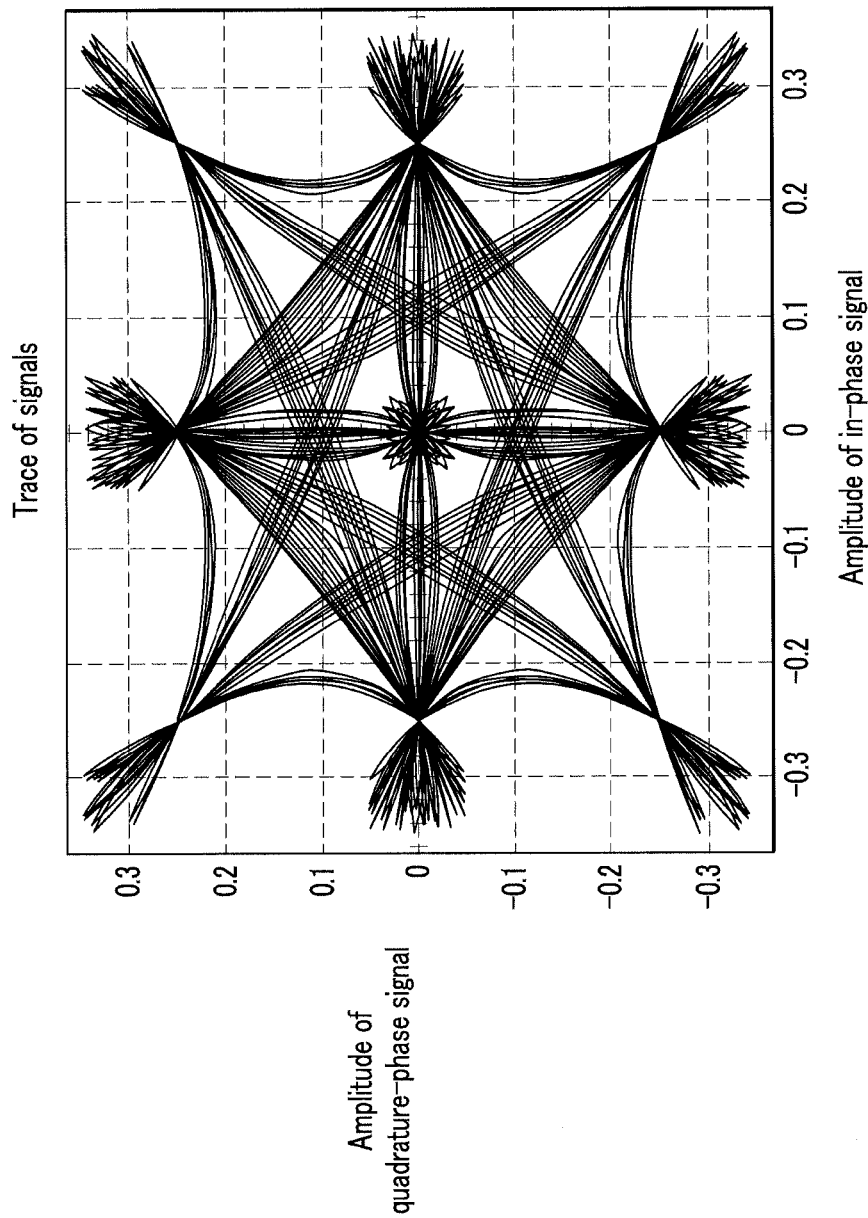
FIG. 5 shows a trace of a signal output from the modulation apparatus in FIG. 4 as a complex plane.

FIG. 3 shows a waveform diagram of a signal output from a modulation apparatus according to an exemplary embodiment of the present invention, FIG. 4 shows a constellation of a signal output from a modulation apparatus according to an exemplary embodiment of the present invention, and FIG. 5 shows a trace of a signal output from the modulation apparatus in FIG. 4 as a complex plane.

Referring to FIG. 3, time delay occurs between an in-phase signal and a quadrature-phase signal, and more specifically, the quadrature-phase signal is output as a signal having a time delay that corresponds to the half of the entire symbol duration T.

Also, as shown in FIG. 4, the constellation of a signal modulated by the method according to an exemplary embodiment of the present invention includes four dots and one starting point, and further includes four dots that are phase-shifted.

By the constellation, it is possible to delete a phase difference between durations in which signals are in succession. More specifically, for example, a 180° phase difference occurs between signals of the sound signal duration.

According to an exemplary embodiment of the present invention, however, the phase difference between signals of the sound signal duration is deleted because one among signals in which a silent signal duration and a sound signal duration are multiplied is delayed, and is then added with the rest of the signals.

In addition, according to the exemplary embodiment of the present invention, the quadrature-phase signal is delayed and is then added to the in-phase signal that is not delayed. In addition, it is possible to generate a modulation symbol by delaying the in-phase signal and adding it with a non-delayed quadrature-phase signal, which may be embodied by a person of ordinary skill in the art based on the exemplary embodiment such that its detailed description will be omitted.

Meanwhile, referring to FIG. 5, traces of signals output from the modulation apparatus according to the exemplary embodiment of the present invention are drawn in a square form or in a form in which signals are stretched in diagonal directions and spectrum distortion caused by a non-linear element can be reduced since a 180° phase difference is cancelled.

In addition, in the modulation apparatus according to the exemplary embodiment of the present invention, there is no signal during the half part T/2 of the entire symbol duration T based on the OPSSK modulation. If a bias voltage technology of a linear power amplifier is applied during the half part T/2 of the entire symbol duration T, the power-efficiency of the modulation apparatus can be improved.

Figure 6:
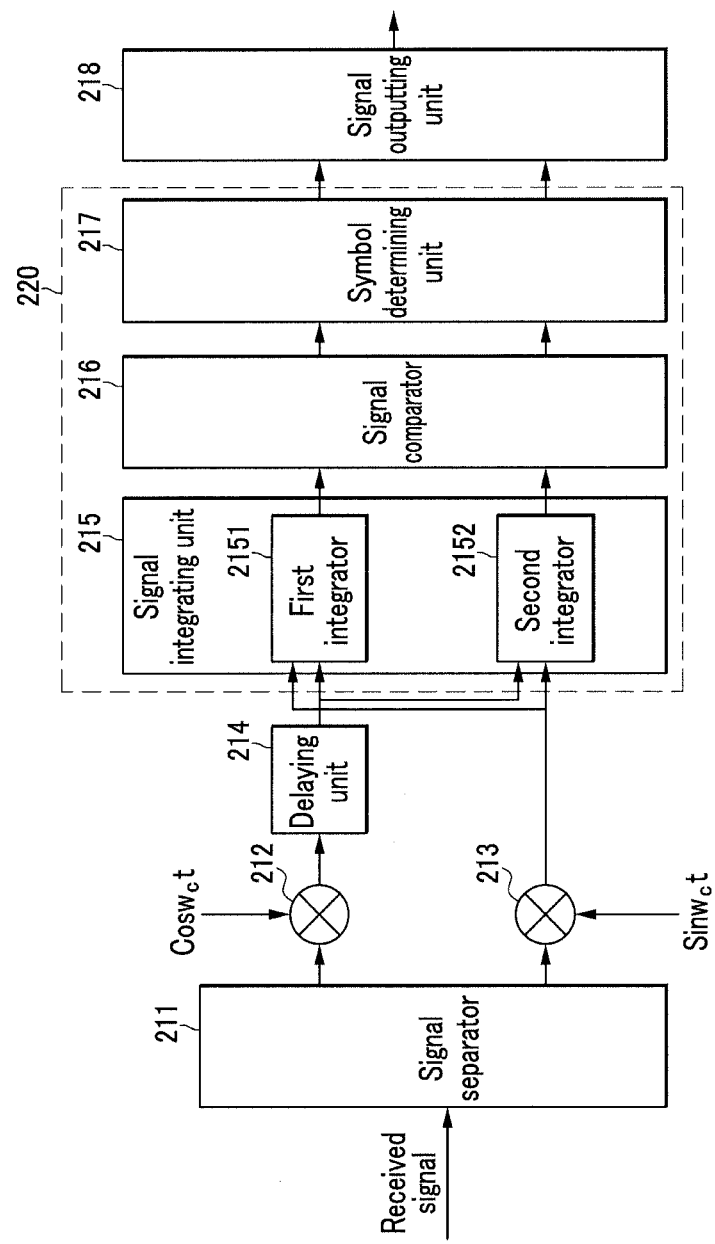
FIG. 6 shows a configuration of a demodulation apparatus according to an exemplary embodiment of the present invention.

FIG. 6 shows a configuration of a demodulation apparatus according to an exemplary embodiment of the present invention.

Referring to FIG. 6, a demodulation apparatus 200 according to an exemplary embodiment of the present invention includes a signal separator 211, multipliers 212 and 213, a delaying unit 214, a signal integrating unit 215, a signal comparator 216, a symbol determining unit 217, and a signal outputting unit 218.

The signal separator 211 separates a received signal into an in-phase signal of an in-phase (I) channel and a quadrature-phase signal of a quadrature-phase (Q) channel. The in-phase signal represents in-phase signal elements of the received signal and the quadrature-phase signal represents quadrature-phase signal elements of the received signal, the received signal being a complex signal.

The multiplier 212 multiplies the in-phase signal by a cosine function (cosw$_c$t), and the multiplier 213 multiplies the quadrature-phase signal by a sine function (sinw$_c$t).

The delaying unit 214 delays the in-phase signal multiplied by the cosine function by a predetermined time in order to correct the in-phase signal with respect to the quadrature-phase signal that has been delayed by the modulation apparatus.

The signal integrator 215 integrates the quadrature-phase signal and the delayed in-phase signal, respectively. In detail, the signal integrator 215 includes a first integrator 2151 and a second integrator 2152. The first integrator 2151 integrates the quadrature-phase signal and the delayed in-phase signal during the duration (0-T/2) that corresponds to the front part of the entire symbol duration T. The second integrator 2152 integrates the quadrature-phase signal and the delayed in-phase signal during the duration (T/2-T) that corresponds to the latter part of the entire symbol duration T.

The signal comparator 216 compares the integrated signals. In detail, the signal comparator 216 compares a value of the signal corresponding to the signal of the front part of the entire symbol duration with a value of the signal corresponding to the latter part of the entire symbol duration.

The symbol determining unit 217 determines the first bit of a symbol on the basis of the comparison result from the signal comparator 216, and performs demodulation with the determined first bit to obtain the other bits of the symbol. The symbol determining unit 217 determines the first bit of the symbol as "o" when the value of the signal corresponding to the signal of the front part of the entire symbol duration is greater than the value of the signal corresponding to the latter part of the entire symbol duration. Further, the The symbol determining unit 217 determines the first bit of the symbol as "1" when the value of the signal corresponding to the signal of the front part of the entire symbol duration is lower than the value of the signal corresponding to the latter part of the entire symbol duration.

Then, the symbol determining unit 217 demodulates the in-phase signal and the quadrature-phase signal to obtain the second bit and the third bit of the symbol.

For example, the symbol determining unit 217 performs a complex conjugate multiplication operation with the determined first bit, and demodulates the in-phase signal and the quadrature-phase signal based on the operation result to obtain the final demodulated signal. Herein, the generic term for the signal integrating unit 215, the signal comparator 216, and the symbol determining unit 217 may be also referred to "a signal determining unit 220".

The signal outputting unit 218 outputs demodulated signals, that is, the final demodulated signal, and more specifically, outputs the first bit, the second bit, and the third bit of the symbol in series as the final signal.

Meanwhile, the demodulation apparatus performs a process that delays an in-phase signal separated from the received signal since a quadrature-phase signal has been delayed in a modulation process performed by the modulation apparatus. On the contrary, the demodulation apparatus may delay a quadrature-phase signal and then perform a demodulation process when an in-phase signal has been delayed in the modulation process, which may be embodied by a person of ordinary skill in the art based on the exemplary embodiment such that its detailed description will be omitted.

The performance of the modulation apparatus and the demodulation apparatus according to the exemplary embodiments of the present invention will now be described.

Figure 7:
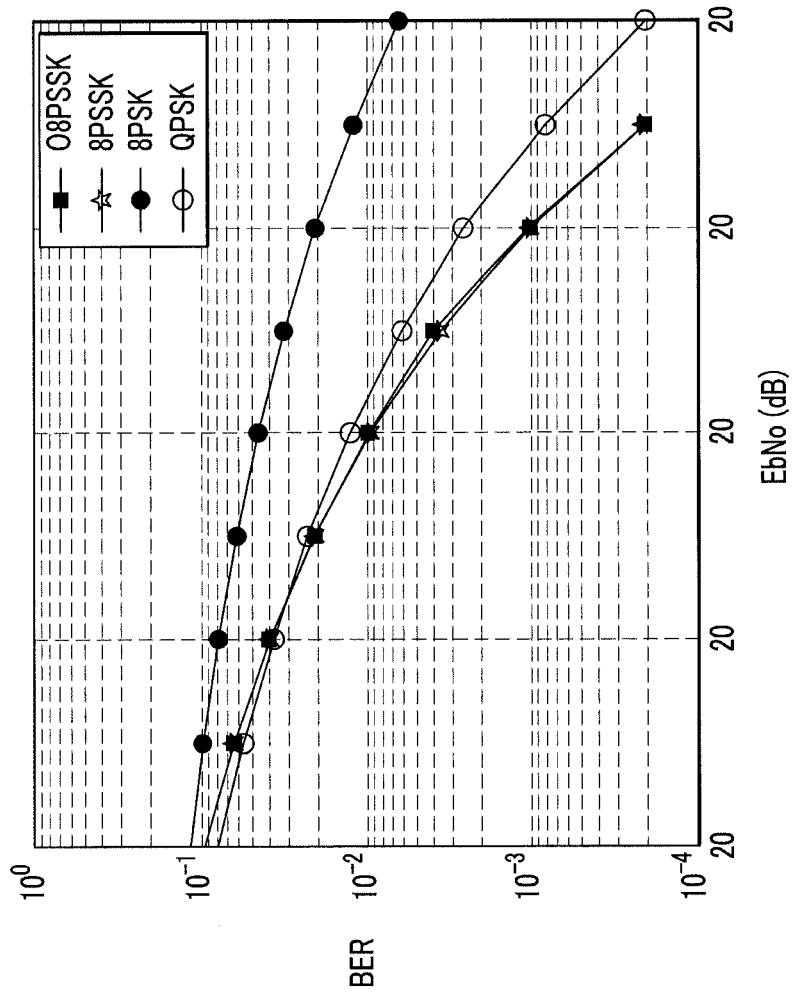
FIG. 7 shows a graph that compares the performance of the modulation method according to an exemplary embodiment of the present invention with the performance of the prior modulation method.

FIG. 7 shows a graph that compares the performance of the modulation method, that is, QPSSK, according to an exemplary embodiment of the present invention with the performance of the prior modulation methods, that is, PSSK, PSK, and QPSK, respectively.

Figure 8:
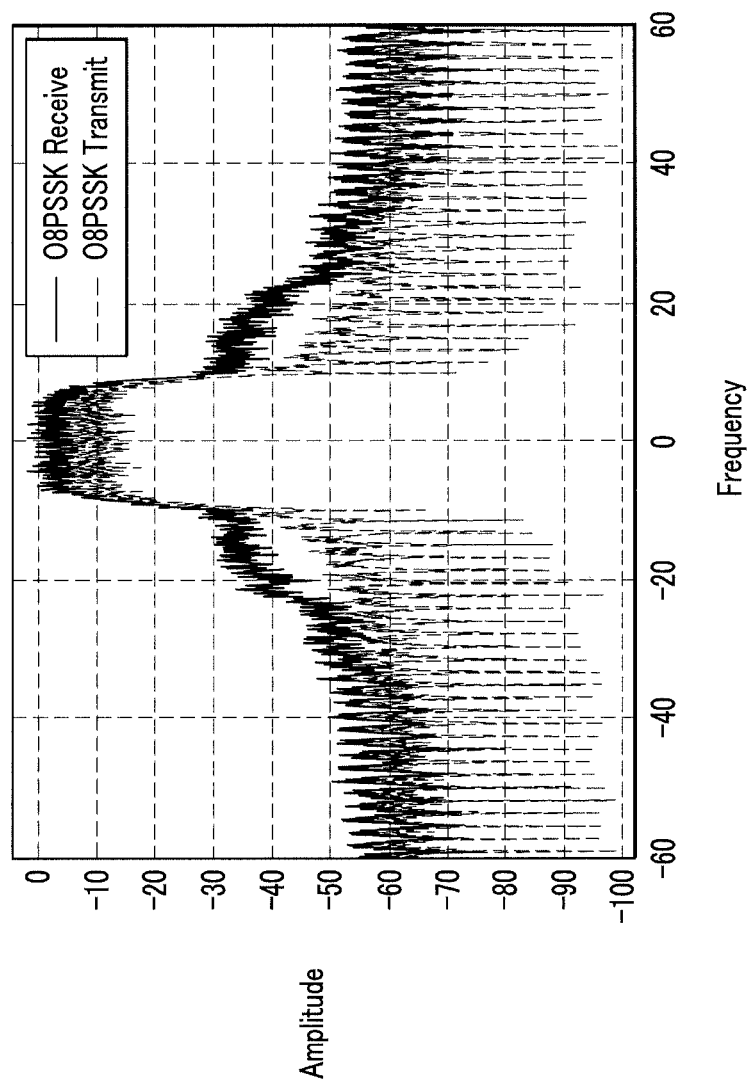
FIG. 8 shows a spectrum characteristic of a modulation apparatus according to an exemplary embodiment of the present invention.
Figure 9:
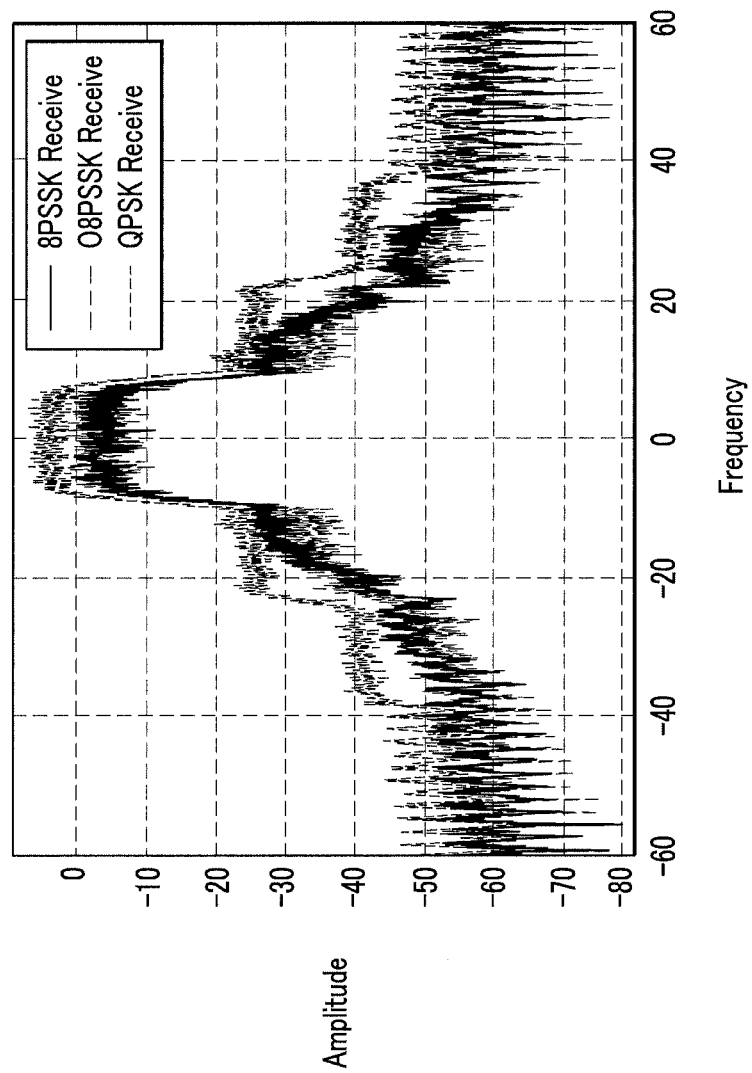
FIG. 9 shows a graph that compares the spectrum characteristic of the modulation method according to an exemplary embodiment of the present invention with the spectrum characteristic of the prior modulation method.

FIG. 8 shows spectrum characteristic of a modulation apparatus using the non-linear power amplifier according to an exemplary embodiment of the present invention. FIG. 9 shows a graph that compares the spectrum characteristic of the modulation method according to an exemplary embodiment of the present invention with the spectrum characteristic of the prior modulation method.

As shown in FIG. 7, when the modulation is performed based on the OPSSK method according to the exemplary embodiment of the present invention, it is known that the performance of the OPSSK method is better than the PSK method and has the same performance as that of the PSSK method, in comparison with the PSSK, PSK, and QPSK methods.

More specifically, FIG. 7 shows the comparison result of the error probability in receiving a signal, that is, a bit error rate (BER) for the modulation methods. OPSSK, 8PSSK, 8PSK, and QPSK in FIG. 7 represent a PSSK method of which M is 8.

Referring to FIG. 7, BERs according to a signal-to-noise ratio (SNR) (Eb/No) for each of the modulation methods can be shown, and particularly, it is known that the BER of the OPSSK method according to the exemplary embodiment of the present invention is low in comparison with the others.

In addition, when comparing the power efficiency of the OPSSK method and the 8PSSK whose M is 8 with those of the others, if the upper value of the BER ($P_M$) is, for example, "$10^{-3m}$", the SNRs of the PSSK and 8PSK methods become "6" and the SNR of the 8PSK method becomes about "7".

Therefore a 1 dB difference in SNR between the PSSK and 8PSK methods and the 8PSK method may be shown. At this time, the SNR of the QPSK method is a very high value such that it may not be shown in the graph of FIG. 7.

Therefore, the power efficiency of the OPSSK method according to the exemplary embodiment of the present invention is the same as that of the PSSK method and is more improved in comparison with to the rest of the modulation methods (PSK, QPSK, etc).

Meanwhile, referring to FIG. 8, the spectrum characteristic of the OPSSK method in using a non-linear power amplifier is shown, and it is shown that the frequency reproduction effect from a received signal occurs according to the characteristic of the non-linear power amplifier.

Also, referring to FIG. 9, when comparing the spectrum characteristic of the OPSSK method according to the exemplary embodiment of the present invention with the others, it is known that the OPSSK method can reduce the frequency reproduction effect by about 10 dB in comparison with the others.

Further, the OPSSK method according to the exemplary embodiment of the present invention has the same performance as the PSSK method, while it can reduce the frequency reproduction effect by about 5 dB in comparison with the PSSK method.

This is caused by adding a time offset to the quadrature-phase signal when modulating and transmitting a signal to reduce the case in which a phase difference between symbols (e. g., a 180° phase difference) occurs.

The result of comparing the probability that the phase difference will occur in the OPSSK method according to the exemplary embodiment of the present invention with those of the others is shown in Table 1.

TABLE 1

| Modulation method | Phase difference probability |
| --- | --- |
| QPSK | 25% |
| 8PSSK | 6.25% |
| OPSSK | 0% |

Table 1 shows the probability that a 180° phase difference will occur between symbols that are next to each other for each modulation method, and particularly, the probability of the OPPSK method corresponding to the case in which the M is "8".

From Table 1, it is known that the OPSSK method according to the exemplary embodiment of the present invention has a low BER, high power efficiency, and an improved frequency reproduction effect in a receiving side because of a very low phase difference probability, in comparison with the others.

According to the exemplary embodiments of the present invention, it is possible to improve frequency efficiency while maintaining a high power efficiency characteristic in signal modulation. In addition, the phase differences between symbols in the signal modulation can be reduced.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for modulating bit information, the apparatus including:
a modulation symbol generator for performing modulation in which a signal wave form is positioned at a front part of an entire symbol duration or a latter part of the entire symbol duration based on a first bit of the bit information to generate a modulation symbol including a silent signal duration in which there is no signal waveform;
wherein the modulation symbol generator includes:
a symbol mapper for mapping the bit information to a symbol to generate a plurality of baseband symbols;
a first multiplier for multiplying a first baseband symbol among the plurality of baseband symbols by a cosine function to generate a first pulse signal and outputs the first pulse signal;
a second multiplier for multiplying a second baseband symbol among the plurality of baseband symbols by a sine function to generate a second pulse signal and outputs the second pulse signal;
a third multiplier for multiplying the first pulse signal by a third baseband symbol among the plurality of baseband symbols such that the first pulse signal includes the silent signal duration;
a fourth multiplier for multiplying the second pulse signal by the third baseband symbol among the plurality of baseband symbols such that the second pulse signal includes the silent signal duration;
a delaying unit for delaying the second pulse signal output from the fourth multiplier and outputting the same;
an adder for adding the delayed second pulse signal to the first pulse signal output from the third multiplier to generate the modulation symbol; and
a transmitter for transmitting the generated modulation symbol.

2. The apparatus for modulating bit information of claim 1, wherein the modulation symbol generator performs the modulation by using a plurality of first baseband signal axes that are based on a multiplication of the cosine function and a first pulse waveform and a plurality of second baseband axes that are based on a multiplication of the sine function and a second pulse waveform to generate the modulation symbol, the first pulse waveform and the second pulse waveform being opposite to each other.

3. The apparatus for modulating bit information of claim 2, wherein the modulation symbol generator delays a quadrature-phase signal corresponding to the second baseband axis and then adds it to an in-phase signal corresponding to the first baseband axis to generate the modulation signal.

4. The apparatus for modulating bit information of claim 3, wherein the modulation symbol generator delays the quadrature-phase signal by the half part of the entire symbol duration.

5. A method for modulating bit information, the method including:
mapping the bit information to symbols to generate a plurality of baseband symbols;
multiplying a first baseband symbol among the plurality of baseband symbols by a cosine function to output an in-phase signal;
multiplying a second baseband symbol among the plurality of baseband symbols by a sine function to output a quadrature-phase signal;
applying a third baseband symbol among the plurality of baseband symbols to each of the in-phase signal and the quadrature-phase signal and outputting the in-phase signal and the quadrature-phase signal that include a silent signal duration, respectively;
delaying one of the in-phase signal and the quadrature-phase signal that include the silent signal duration; and
adding the delayed one and the other that is not delayed to generate a modulation symbol.

6. The method for modulating bit information of claim 5, wherein the delaying delays the quadrature-phase signal.

7. The method for modulating bit information of claim 5, wherein the delaying delays one of the in-phase signal and the quadrature-phase signal that include the silent signal duration by a half of an entire symbol duration.

* * * * *